(12) United States Patent
McKay

(10) Patent No.: US 8,317,234 B2
(45) Date of Patent: Nov. 27, 2012

(54) CONNECTOR

(75) Inventor: David Ernest McKay, Grampian (GB)

(73) Assignee: Subsea Technologies Limited, Aberdeen (GB)

( * ) Notice: Subject to any disclaimer, the term of this patent is extended or adjusted under 35 U.S.C. 154(b) by 194 days.

(21) Appl. No.: 12/673,185

(22) PCT Filed: Aug. 5, 2008

(86) PCT No.: PCT/GB2008/050667
§ 371 (c)(1), (2), (4) Date: Apr. 30, 2010

(87) PCT Pub. No.: WO2009/019515
PCT Pub. Date: Feb. 12, 2009

(65) Prior Publication Data
US 2011/0025044 A1   Feb. 3, 2011

(30) Foreign Application Priority Data

Aug. 8, 2007 (GB) .................................. 0715385.1
Mar. 1, 2008 (GB) .................................. 0803940.6

(51) Int. Cl.
*F16L 35/00* (2006.01)
(52) U.S. Cl. ........................................... 285/81; 285/18
(58) Field of Classification Search .................. 285/920, 285/34, 35, 320, 81, 322, 18
See application file for complete search history.

(56) References Cited

U.S. PATENT DOCUMENTS

| | | | | |
|---|---|---|---|---|
| 3,222,088 A * | 12/1965 | Haeber | ............................ | 285/18 |
| 4,057,267 A * | 11/1977 | Jansen, Jr. | ....................... | 285/18 |
| 4,222,591 A * | 9/1980 | Haley | ............................... | 285/18 |
| 4,335,904 A * | 6/1982 | Saliger et al. | ................... | 285/18 |
| 4,433,859 A * | 2/1984 | Driver et al. | .................... | 285/34 |
| 4,526,406 A * | 7/1985 | Nelson | .............................. | 285/18 |
| 4,557,508 A * | 12/1985 | Walker | ............................. | 285/84 |
| 4,699,215 A * | 10/1987 | Cuiper | ........................... | 166/341 |
| 4,902,044 A * | 2/1990 | Williams et al. | ................. | 285/18 |
| 5,941,574 A * | 8/1999 | Hamilton et al. | ................. | 285/3 |
| 5,961,156 A * | 10/1999 | Furuhashi | ................... | 285/154.1 |
| 6,293,343 B1 * | 9/2001 | Pallini et al. | .................. | 166/345 |
| 6,375,152 B1 * | 4/2002 | Weh et al. | .................. | 251/149.6 |
| 7,469,931 B2 * | 12/2008 | Biester | ........................... | 285/18 |
| 7,878,551 B2 * | 2/2011 | McHugh et al. | .............. | 285/308 |
| 2002/0050047 A1 | 5/2002 | Bekkevold et al. | | |
| 2003/0168857 A1 | 9/2003 | Jennings | | |
| 2005/0146137 A1 * | 7/2005 | Davidson et al. | ............. | 285/322 |

FOREIGN PATENT DOCUMENTS

GB          2104170 A       3/1983
WO    WO-03/048512 A1      6/2003

OTHER PUBLICATIONS

Mauries, Laurent, "International Search Report" for PCT/GB2008/050667 as mailed Jan. 27, 2009 (2 pages).

* cited by examiner

*Primary Examiner* — Aaron Dunwoody
(74) *Attorney, Agent, or Firm* — Winstead PC

(57) ABSTRACT

A connector for connecting a plurality of components having cooperating faces together. The connector includes a plurality of dogs for locking the cooperating faces of upper and lower conduits together. The plurality of dogs are movable between an open position and a locked position. A hydraulic piston moves the plurality of dogs into the locked position. The connector includes an annular collar that retains the plurality of dogs in the locked position once the hydraulic piston is withdrawn. When the annular collar is removed, the plurality of dogs return to an unlocked position thereby allowing separation of the cooperating faces without snagging of the plurality of components.

21 Claims, 18 Drawing Sheets

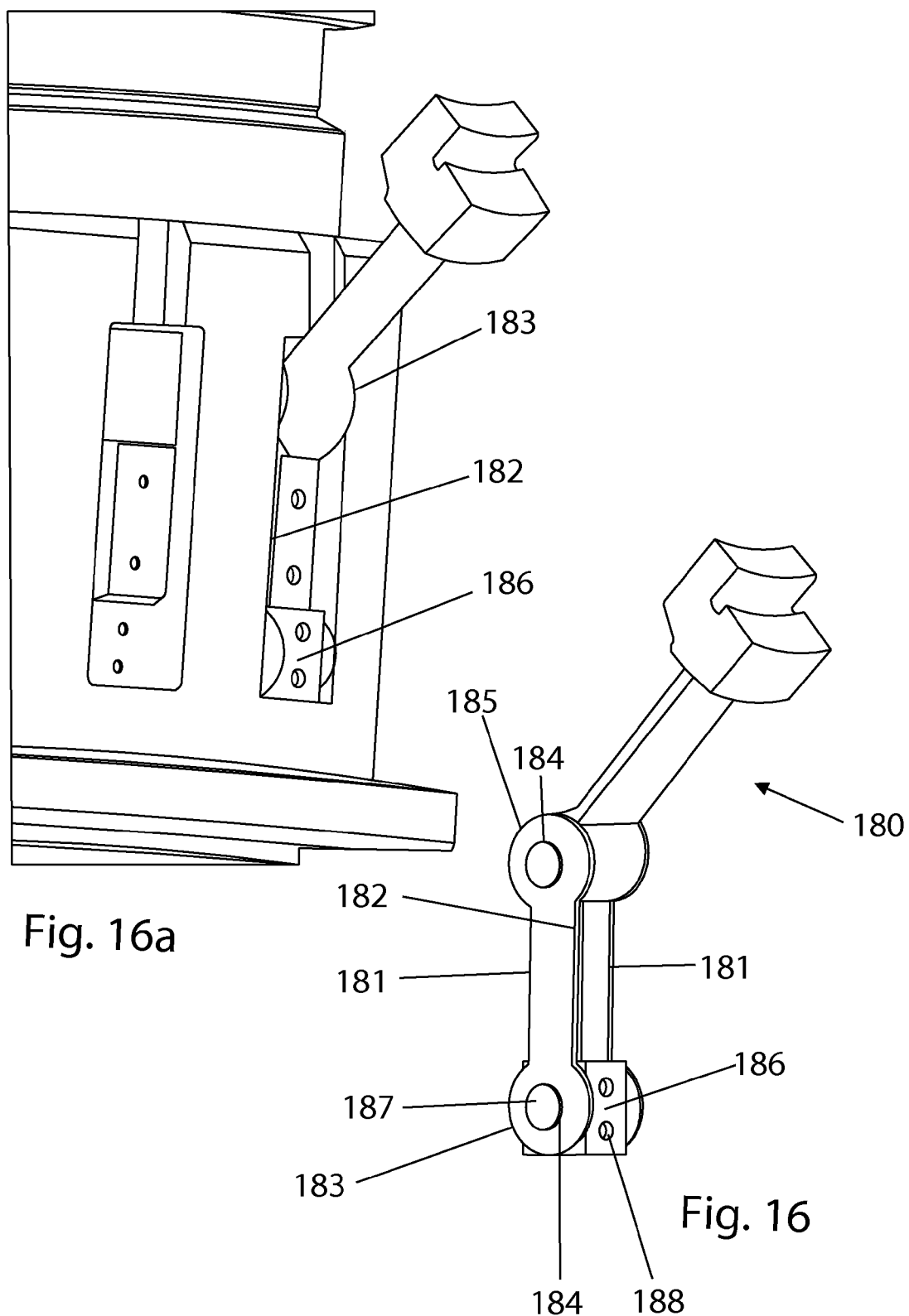

CONNECTOR

This invention relates to a connector and more, particularly to a connector which is suitable for use off shore and most particularly in relation to subsea connections, and, more specifically to a connector which can be swiftly disconnected in an emergency.

Offshore drilling operations typically require a number of connections between adjacent equipment such as for example a connection between a flowline for transporting hydrocarbons from a well and a hub mounted on a Christmas tree on the wellhead or riser pipe and foundation casing strings. Such connections must be able to provide a seal between the various components such that fluids flowing through the respective components will not leak out into the surrounding sea. Furthermore, the connections must be able to withstand high bending moments and/or tensile strength loads as the components are prone to movement due to the extreme conditions, and particularly high pressures at which they are designed to perform.

Vessels are commonly used in subsea drilling and intervention operations from which a rigid riser is suspended in the sea and the free end of the riser is connected through a hub to a subsea structure such as the hub of a Christmas tree This allows fluids such as processing fluids or tools to be passed down into the subsea wellhead and also for produced fluids such as hydrocarbons for flow through the riser to the surface for recovery.

From the time that the connection is made until the connection is broken by releasing the free end of the riser from the hub of the wellhead, the vessel on the surface is physically connected to the seabed by the rigid riser. It is essential that the vessel maintain a position directly above the connection between the riser and the hub in order to avoid the bending loads experienced across the connection becoming excessive to the point where they could compromise the connection or damage the riser. The position of the vessel is influenced by prevailing conditions. Vessels currently use global positioning satellite technology in order to maintain their position above the connection point for the suspended riser. However, if the event of a loss of engine power on the vessel or a situation in which the positioning equipment fails, the vessel can very quickly drift out of position and both the safety of the vessel and the equipment will be compromised due to the physical connection of the vessel to the seabed.

In such circumstances it is essential that the valves controlling flow through the riser be shut down before the riser is disconnected otherwise fluids in the riser can flow down into the sea or fluids produced under pressure from the wellhead can be released.

Hydraulic connectors for connecting components of subsea equipment have been in existence for many years. These connectors generally operate on the principle that one or both of the mating parts have a locking profile machined in it. Locking means that are securely attached to one mating half are functioned in a manner that they engage with the other and form part of the load path that secures the two components together.

In general these connectors can be divided into those that create a positive compressive load across the interface so preloading the connection against stress variation and separation resulting from subsequent external loading, and those that simply create a mechanical lock which will move and separate under the loading within the limits of physical gaps and material stretch.

One method commonly used for such connectors is a configuration where the locking means are received in recesses within one component and are moved inwards or outwards through the recess to engage with the mating profile on the mating component.

Another common configuration has the locking means as tensile members which are assembled on one of the mating components and on functioning move into a position where they simultaneously engage with the profile in the mating component so locking the two together. An example of such a connector is known from WO 03/048512.

Numerous critical applications require a preloaded connection to:
1. guard against leaks resulting from separation of the mating components under load;
2. prevent relevant movement of components that could result in fretting between surfaces and so damage the parts, and
3. prevent stress fluctuations that could result premature component failure due to fatigue.

For preloaded connections both the above mentioned configurations utilise some form of mechanical force input to force the locking means into position and in doing so generate a compressive force between the two mating components. It is common practice for this force to be applied by means of hydraulic cylinders that act directly on a cam ring, which in turn acts on the locking means. In order to generate sufficient preload the cam ring to locking means interface will generally be designed such that the contact faces are at a shallow angle so allowing a mechanical advantage by means of a wedging action.

The wedging action used to generate the connector preload requires that the actuation cam and hence hydraulic cylinder has a fairly lengthy stroke to first move the locking means from a fully disengaged position into initial contact and onwards to full preload. During make up of the connector this large stroke is not a particular issue other than the physical space required to accommodate it. However in some specific applications the time taken to disconnect the connector is critical as it forms part of a sequence of events that must take place automatically to close and secure a well and disconnect the vessel from the subsea infrastructure.

In addition the overall connector interface design must be such that once disconnect has taken place the connector will disengage and come away freely without snagging and causing damage that would prevent subsequent reconnection.

It is an object of the present invention to provide a connector which overcomes or at least mitigates the above problems.

It is a further object of the present invention to provide a connection which can be swiftly released should an emergency situation arise.

According to one aspect of the present invention there is provided a connector for connecting components having cooperating faces together, said connector comprising means for locking the co-operating faces of the conduits together, said locking means movable between open and locked positions, actuating means for moving the locking means into the locked position and means for retaining the locking means in the locked position once the actuating means is withdrawn, the arrangement being when the retaining means is removed the locking means return to an unlocked position thereby allowing separation of the cooperating faces without snagging of the components.

Preferably the stroke of the retaining means to release the locking means being shorter than the stroke of the actuating means to move the locking means into their locked position.

Advantageously, the retaining means and the actuation means are moved by respective pistons.

Preferably, the pistons are hydraulically actuated.

More preferably the volume of hydraulic fluid required to release the retaining means is less than the volume of fluid required to deploy the actuating means to bring the locking means into the locked position.

Advantageously, the force required to release the retaining means is less than that required to deploy the actuating means to move the locking means into their locked position.

Preferably biasing means are provided to bias the locking means into the open position.

Advantageously, means are provided for pretensioning the locking means.

Preferably, the pretensioning means comprises means for increasing the length of the locking means.

Conveniently, the pretensioning means comprises a hydraulic cylinder mounted within the locking means.

Alternatively, the actuating means are provided with a profiled surface which co-operates with a profiled surface on the locking means to pretension the locking means as they are moved into the locked position.

Preferably, the locking means comprises a plurality of dogs pivotally mounted to one of said components.

Preferably also, said plurality of dogs have a clamping surface which forms a substantially continuous ring when in the locked position.

Preferably the actuation means comprises an annular collar which is slidably mounted on one of said components.

Conveniently the actuation means is mounted below the locking means and are raised to move the locking means into the locked position.

Advantageously, the retaining means comprises an annular collar.

Preferably, said annular collar is slidably mounted above the locking means.

Conveniently, the connector comprises first and second conduits adapted to be mounted on a riser and subsea installation respectively upon which conduits the co-operating faces are provided.

Embodiments of the present invention will now be described by way of example with reference to the accompanying figures in which:

FIGS. 16 and 16a are schematic perspective views of an alternative locking means of the present invention in a first, unlocked position;

FIG. 18 is a schematic perspective view of an enlarged region of FIG. 17a.

Figure 1:
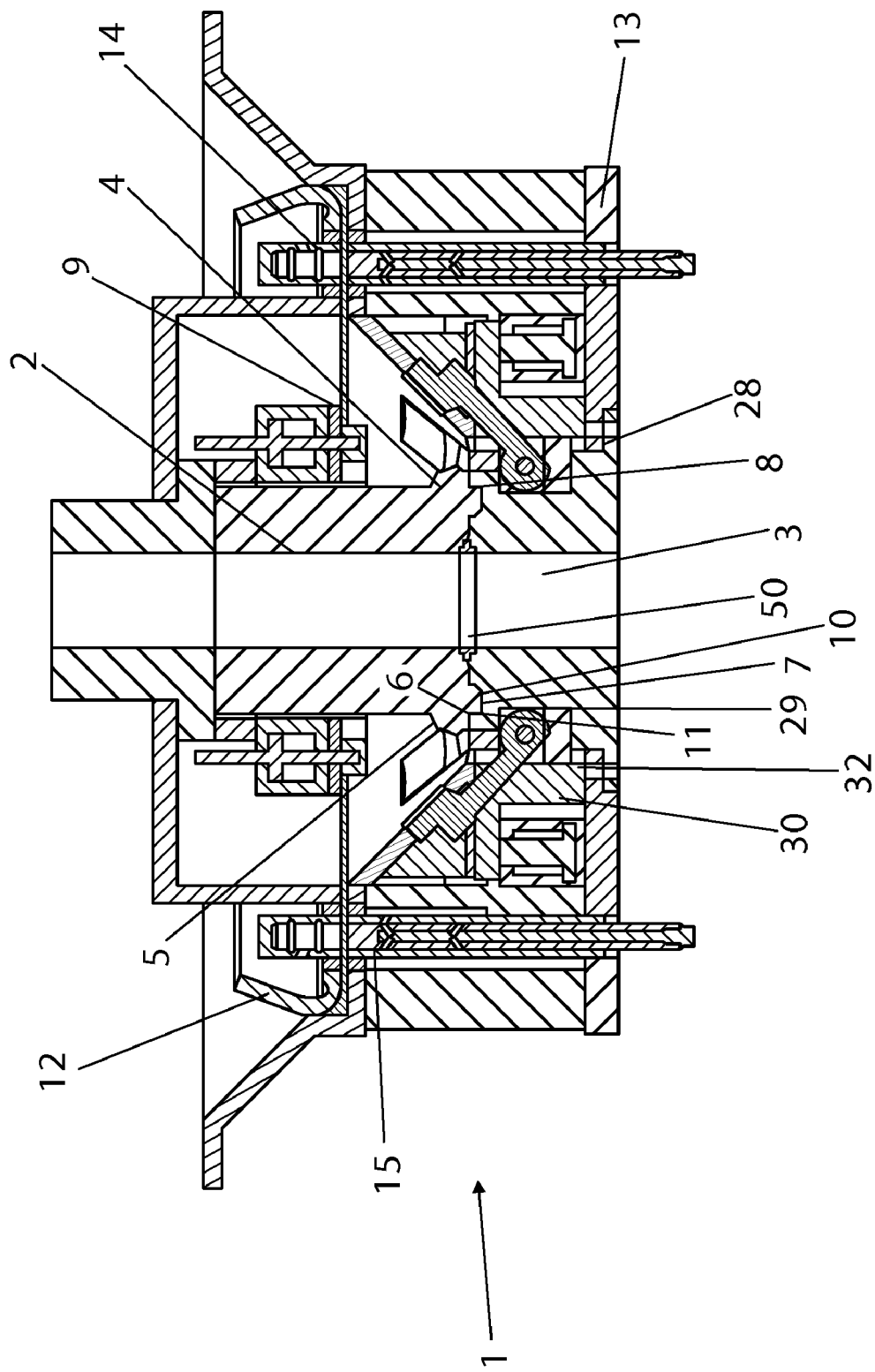
FIG. 1 is a schematic cross-sectional view of a connector according to one aspect of the present invention in an open condition.
Figure 2:
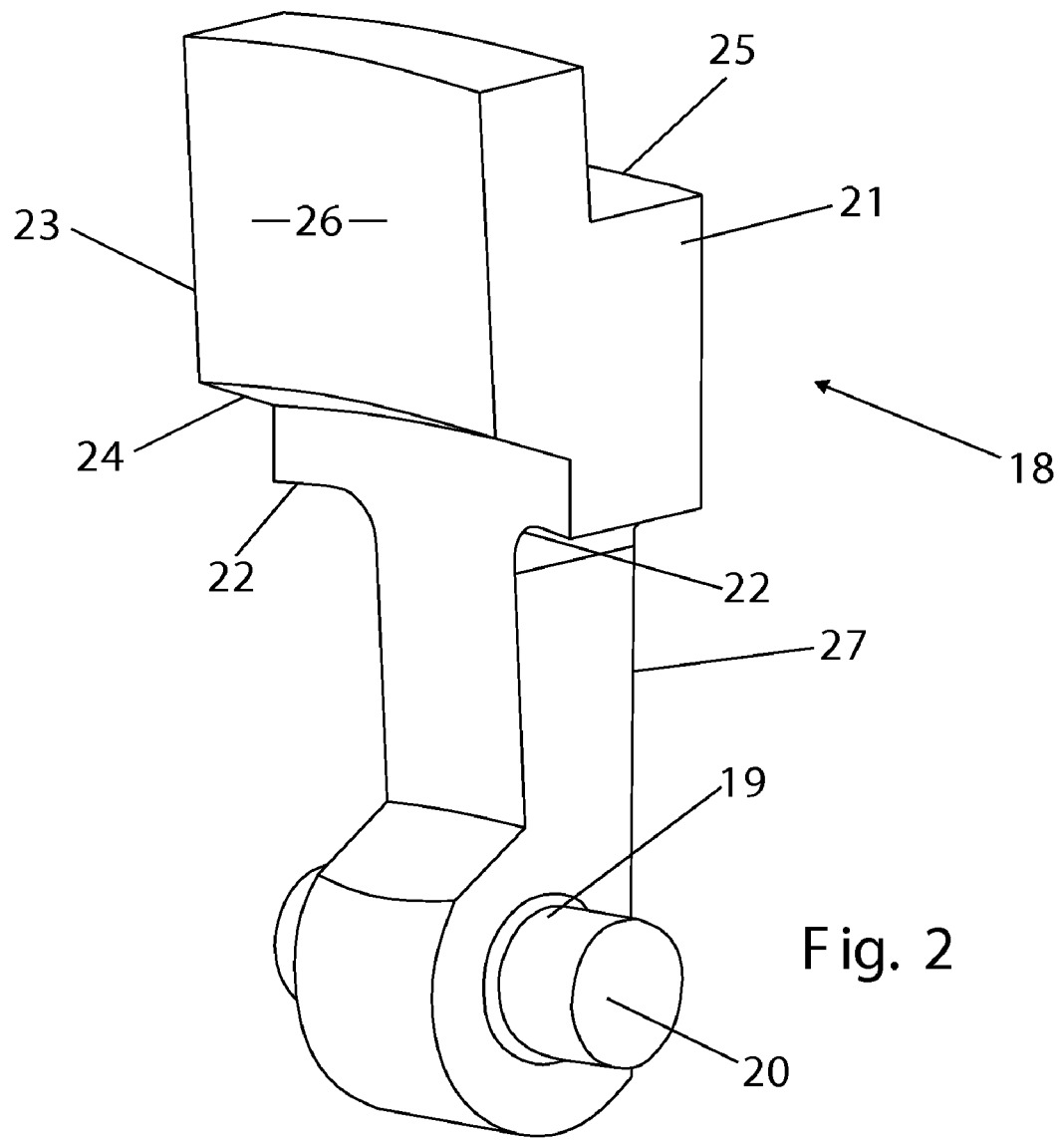
FIG. 2 is a perspective view of a locking means of the connector of FIG. 1.
Figure 3:
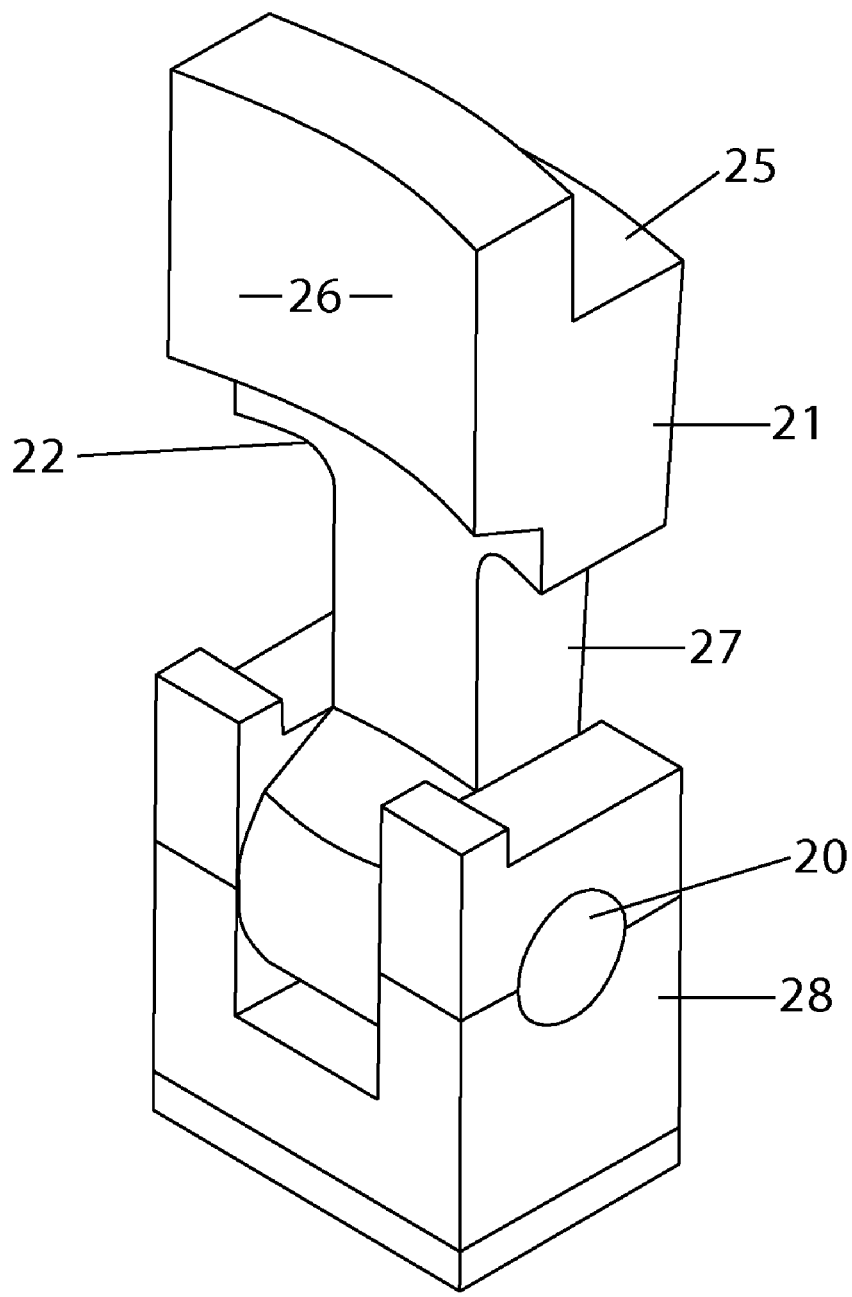
FIG. 3 is a perspective view of the locking means of FIG. 2 mounted in a block.

Turning now to the figures, there is shown in FIG. 1 a connector 1 which is suitable for connecting a rigid riser suspended from a surface vessel to a subsea installation such as for example the hub of a wellhead or intervention BOP.

The connector comprises upper and lower annular conduits 2, 3 adapted to be mounted on the free end of the riser and the top of the subsea installation respectively. Alternatively, the upper and lower conduits may be integral with the riser and a hub or other component of the subsea installation.

For the purposes of the following description, the conduit mounted on the free end of the riser is described as the upper conduit 2 and the conduit mounted on the subsea installation is described as the lower conduit 3. In some other applications, the upper and lower conduits could of course be reversed.

In the embodiment shown, the lower end of the upper conduit terminates in an annular flange 4 which has a tapered upper surface 5 which slopes down from the outer surface of the conduit to the outer edge of the flange. The underside of the flange is undercut 6 to provide a stepped configuration on the end face of the conduit such that the central portion 7 of the annular conduit projects beyond the undercut surface. The transition 8 from the undercut surface to the central portion of the annular conduit is provided by a sloping annular face which slopes from the undercut towards the central portion.

A second annular flange 9 is provided around the outer surface of the conduit, the second flange being spaced from and positioned above the terminal flange 4. The second flange has a substantially rectangular cross section.

The upper end face of the lower conduit has an annular central portion 10 which is recessed into the end face of the lower conduit and a transition 11 from the central portion to the main end face is provided by a sloping annular face which slopes from the central portion to the main end face. Therefore, when the end faces of the upper and lower conduits are brought together, the main face of the lower conduit abuts the undercut 6 of the flange of the upper portion and the central portion 7 of the upper conduit projects into the recessed central portion 10 of the lower conduit. The transition face 8 of one conduit abuts or engages closely with the transition face 11 of the other.

Figure 7:
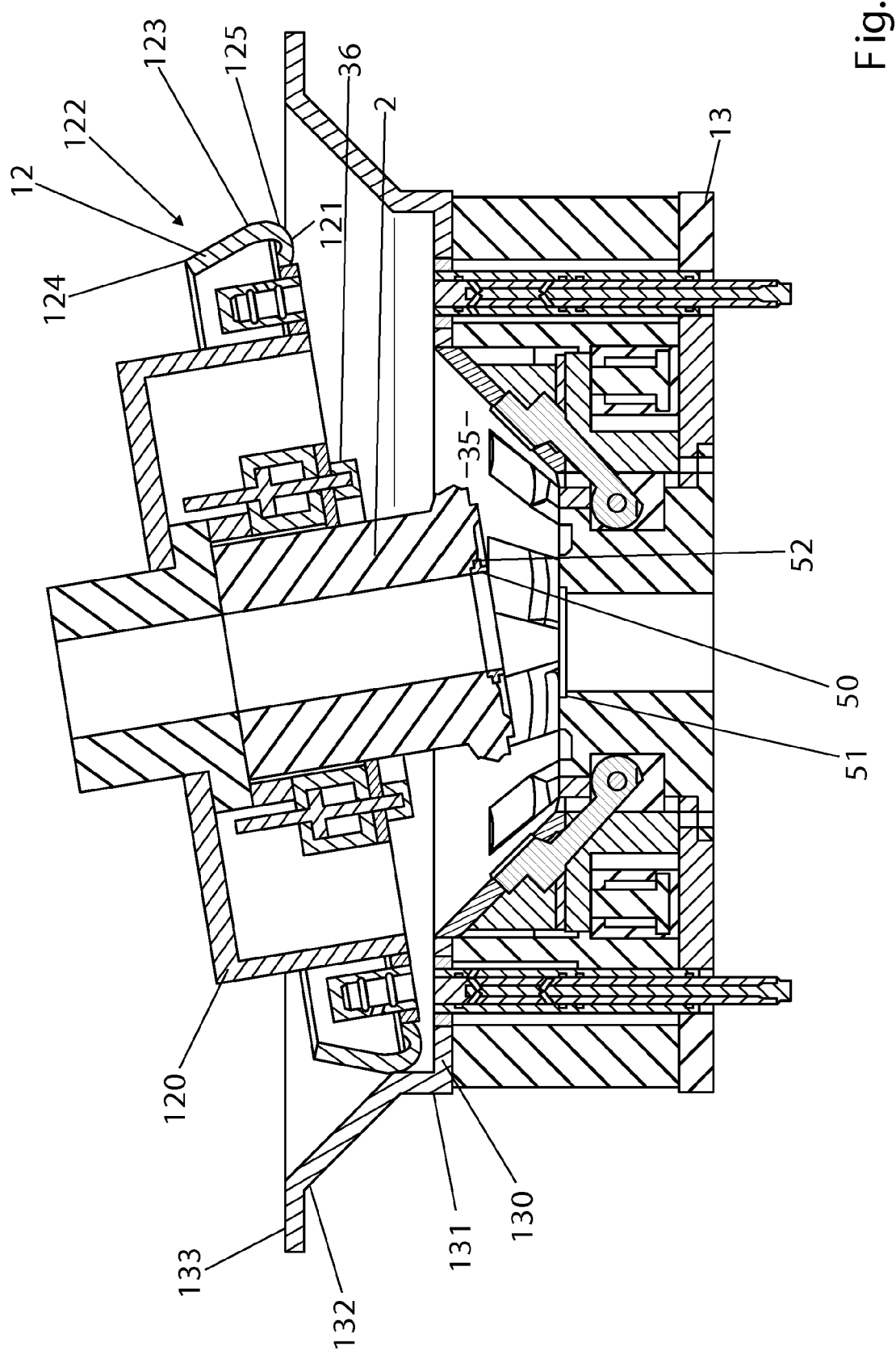
FIG. 7 is a schematic view of the locking means of FIG. 6 as the connector is disengaged.
Figure 8:
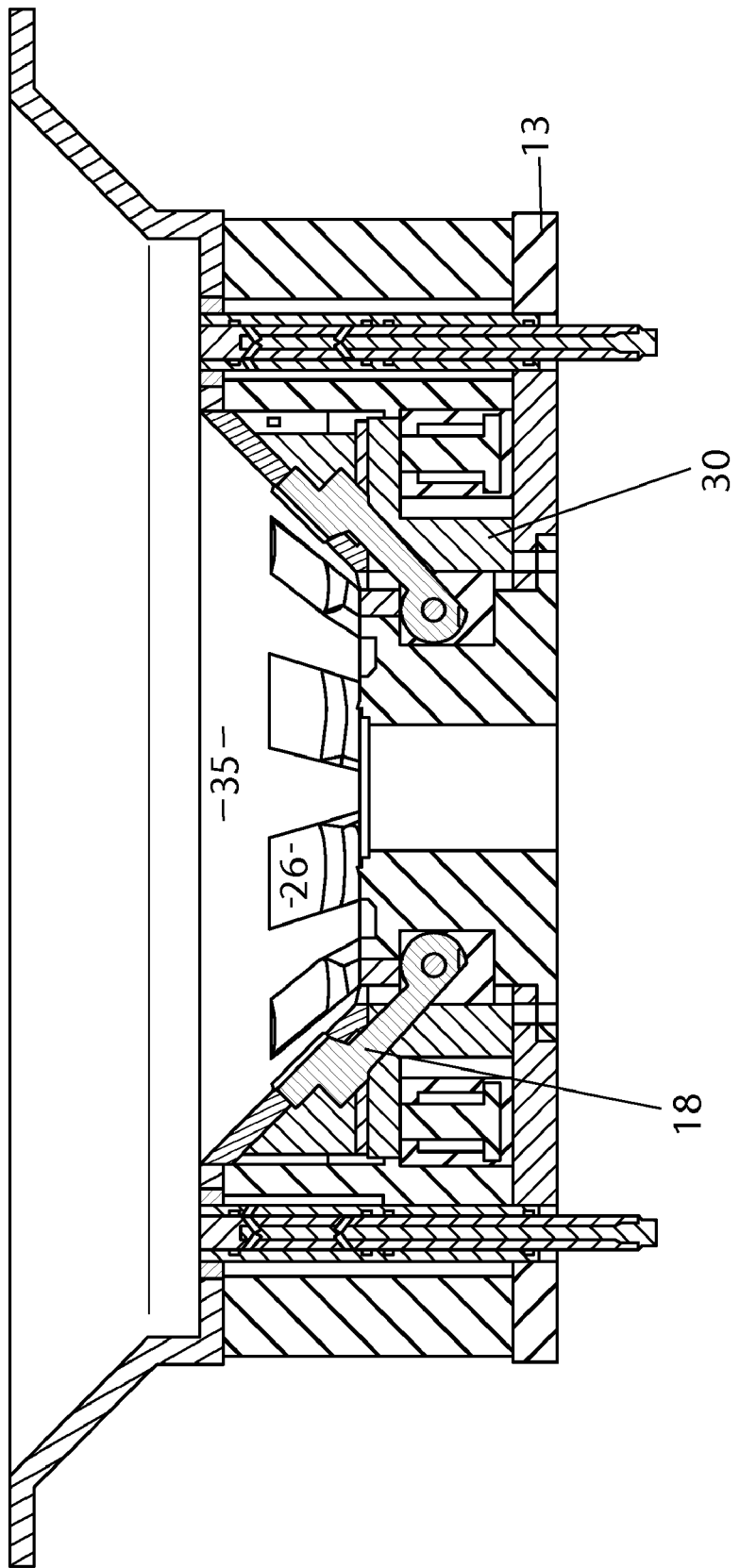
FIG. 8 is a schematic view of the lower part of a connector of FIG. 1.
Figure 9:
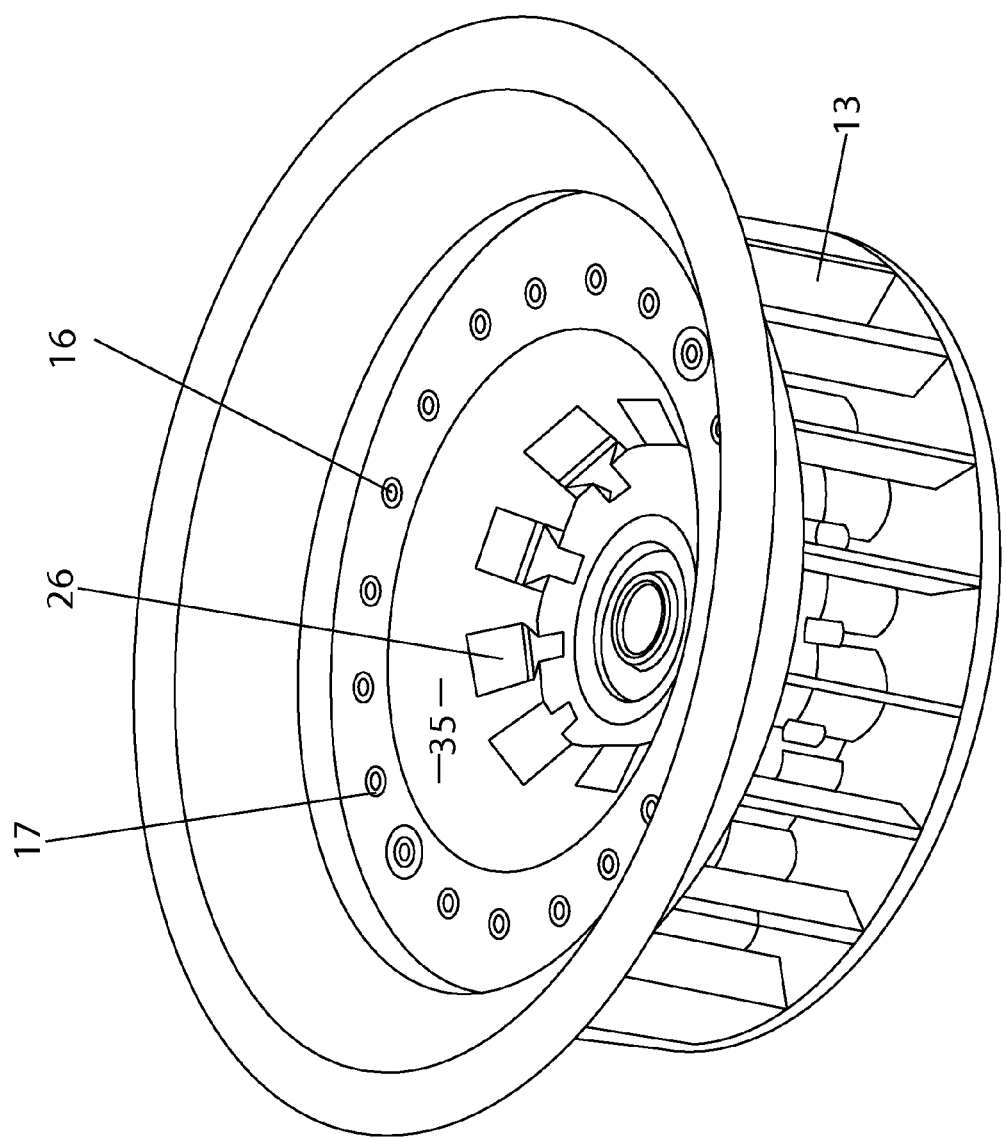
FIG. 9 is a schematic view from above of the lower part of the connector of FIG. 8.

In the embodiment shown, a sealing means such as for example a gasket 50 is mounted between the end faces of the upper and lower conduits. The gasket may be mounted to the end face of the upper conduit and this is shown in greater detail in FIG. 7. The end faces of one or both the upper and lower conduits may be recessed to receive the gasket. The recess 51 in the lower conduit is also shown in FIG. 7. The gasket preferably may have an annular form with an annular bead 52 provided around the outer surface thereof.

The gasket provides a fluid tight seal between the upper and lower conduits.

The upper and lower conduits are surrounded by upper and lower frame elements 12, 13 of the connector. Means are provided for establishing a hydraulic connection across the frame elements. In the embodiment shown, one or more bores 14 or apertures are provided in the upper frame element which correspond in position with bores or apertures 15 provided in the lower frame element.

The upper frame element 12 comprises a main housing 120 which is preferably tubular and surrounds the upper conduit or alternatively may surround the riser or other component to which the upper conduit is mounted in some embodiments.

Additionally, the upper frame element comprises an annular flange 121 which surrounds the housing 120. The annular flange extends substantially horizontally from the housing and terminates in an upturned rim 122.

In the embodiment shown, the rim has a first component 123 which extends substantially vertically to the flange 121, and a second component 124 preferably integral with the first, which extends upwardly of the first component but tapers inwards towards the housing.

The transition between the annular flange 121 and the tapered second component forms an elbow 125. The outer surface of the elbow is substantially curved between the annular flange 121 and the first component, substantially straight in the region of the first component and angled between the first and second components.

The bores 14 or apertures are formed in the annular flange 121.

The lower frame element 13 is provided on its upper surface, with an annular housing comprising a base portion 130 in which bores or apertures 15 are formed. A peripheral wall 131 surrounds the base and extends substantially vertically (in use) from the base. In some embodiments the peripheral wall may taper slightly inwardly towards the centre of the base.

A funnel 132 extends from the upper end of the peripheral wall. The funnel 132 is preferably integrally formed with the peripheral wall. The funnel tapers outwardly from the peripheral wall and provides a guide for the upper conduit as this is being lowered towards the lower conduit for connection.

A substantially horizontal annular rim 133 surrounds the upper edge of the funnel 132. The rim is preferably integrally formed with the funnel.

A plurality of control couplers 16 are mounted in cylinders 17 within the bores of the lower frame element, each cylinder containing a coupler 16 which may be extended into the corresponding bore in the upper frame element.

The hydraulic control couplers are withdrawn below the surface of the lower frame element until the upper frame element is in position such that they do not impede the abutment of the frame elements and to prevent damage to the connectors during insertion.

A further advantage of the hydraulic control couplers being withdrawn before connection is that they effectively block the bores in the lower frame element, thereby preventing debris from clogging the bores during the insertion process and, being pressure balanced, simultaneously allow the hydraulic supply lines to be pressure tested against the hydraulic couplers without the upper frame element in place.

Figure 4:
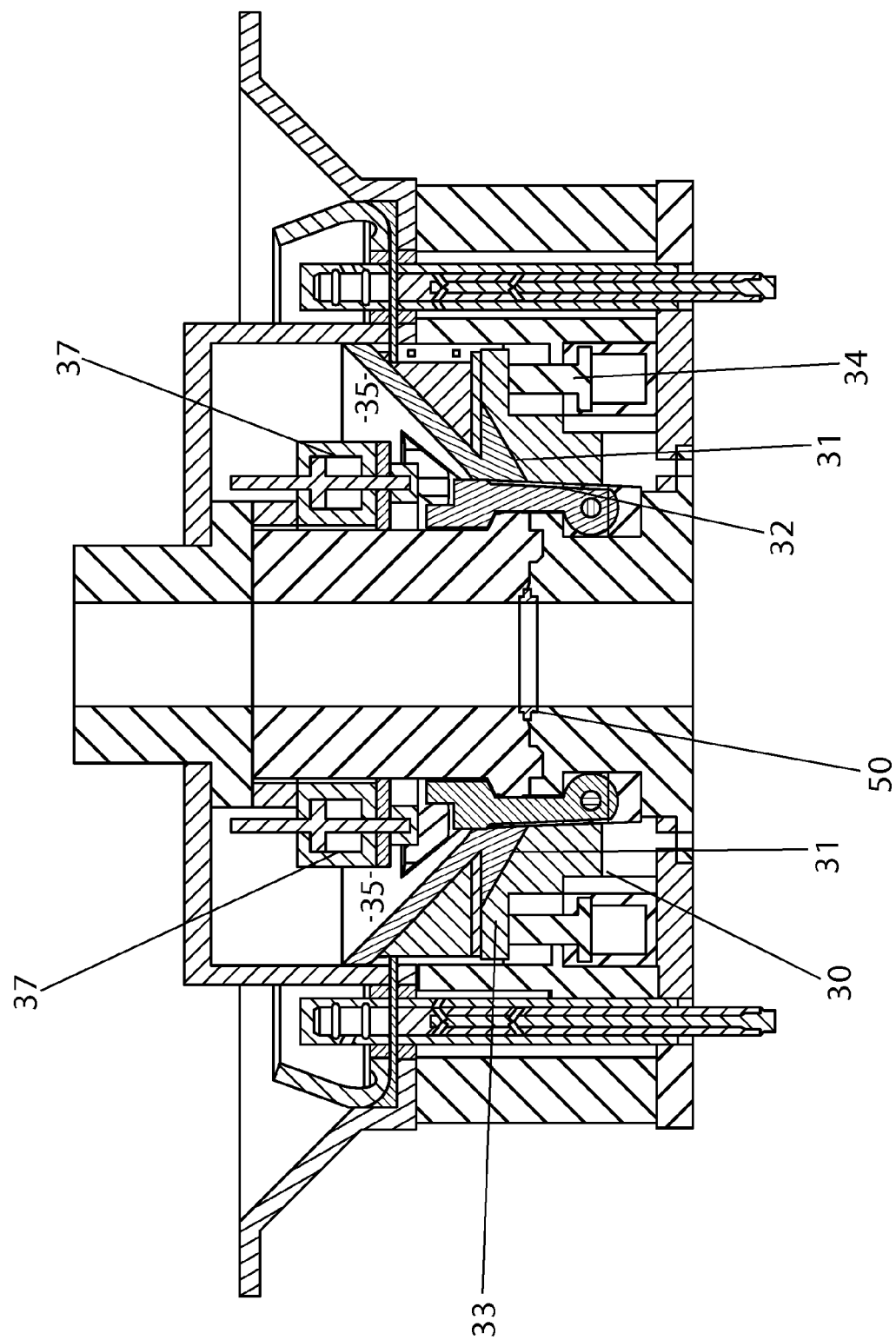
FIG. 4 is a schematic cross-sectional view of the connector of FIG. 1 in a locked condition.
Figure 5:
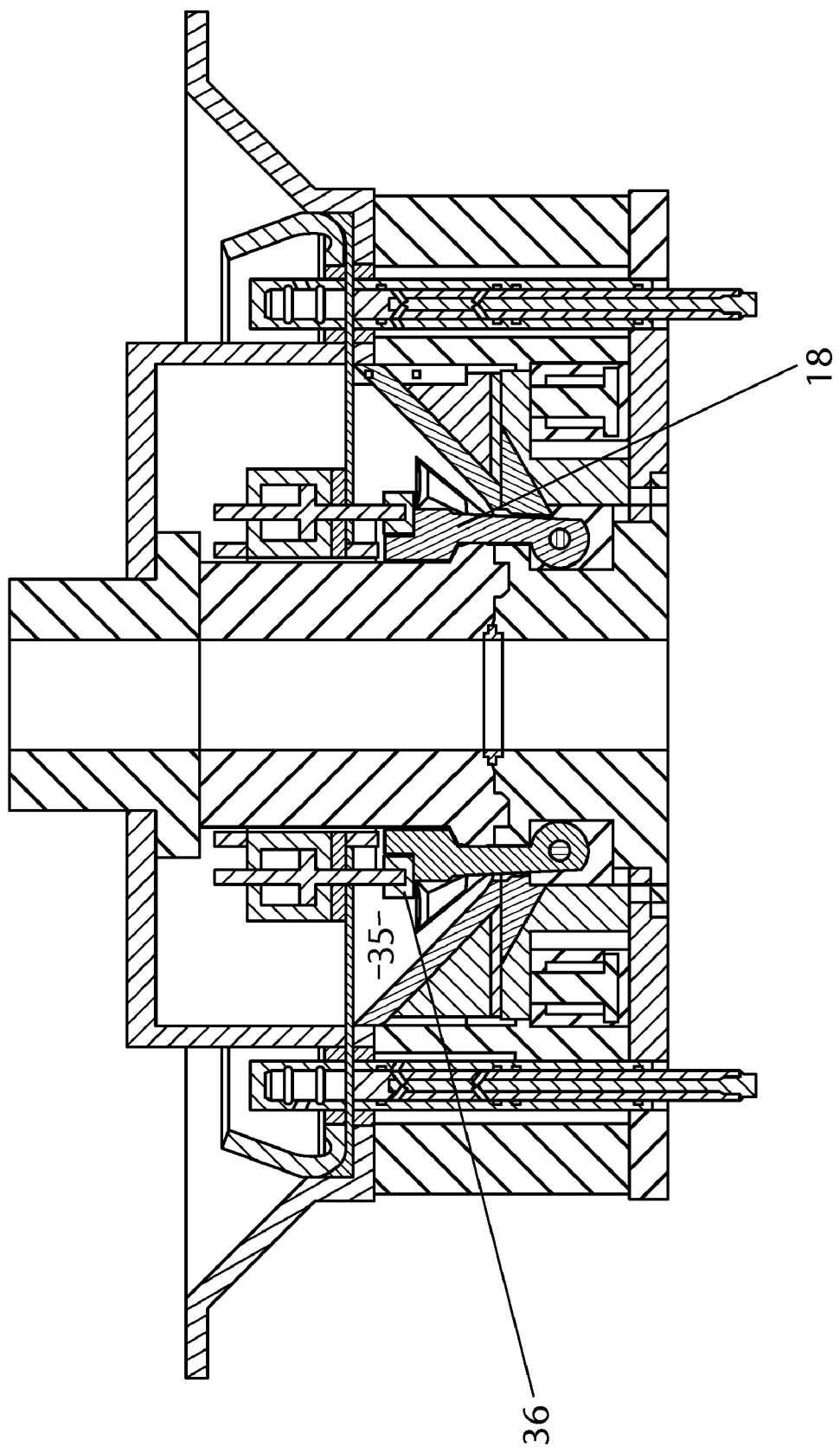
FIG. 5 is a schematic view of the connector of FIG. 1 with the retaining means deployed.
Figure 6:
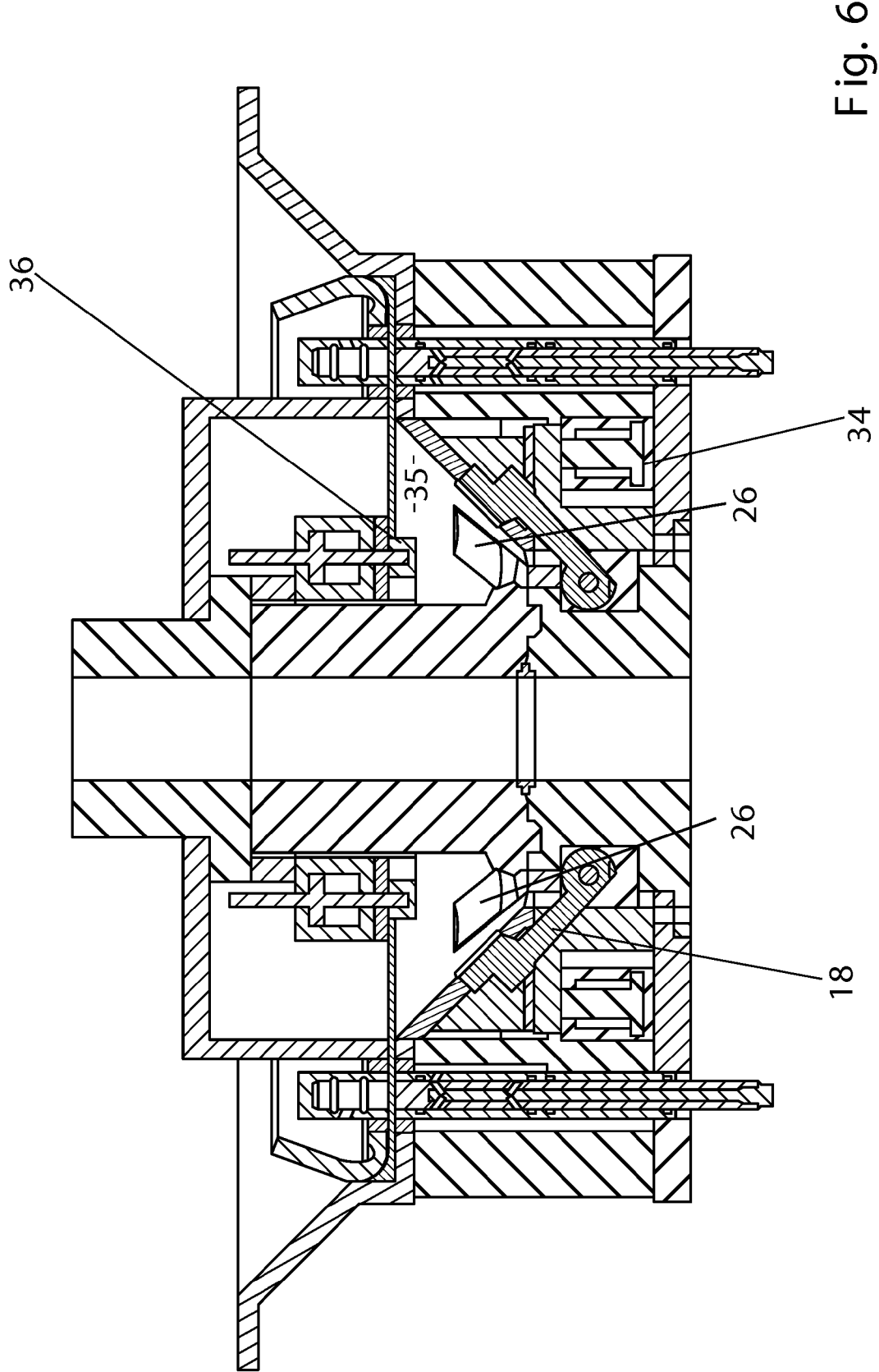
FIG. 6 is a schematic view of the connector of FIG. 1 with the locking means released.

Means are provided for locking the end faces of the upper and lower conduits together to provide a secure connection between the riser and the sub sea installation. In the example shown, the locking means comprise a plurality of dogs 18 which are pivotally mounted adjacent the upper end of the lower conduit. Each dog is pivotal from an open position shown in FIG. 1 in which the dog extends outwardly from the lower conduit to a locked position as shown in FIG. 4 in which the dog lies substantially parallel to the axial direction of the lower conduit and engages with the lower flange of the upper conduit as will be described further below.

The dogs 18 have a generally elongate rectangular body with an aperture 19 at one end to receive a pivot pin 20. In some embodiments the pivot pin may be integral with the body of the dog. The end of the body remote from the aperture has an enlarged head 21 which projects transversely at right angles to the body to provide a pair of shoulders 22. A stepped region 23 is provided on the head of the dog with a sloping transition 24 between the head and the stepped region which corresponds in depth to the sloping face 5 of the terminal flange 4 of the upper conduit.

The stepped region 23 projects beyond the end of the head of the dog to form a recess 25 in the upper end of the dog. In some embodiments, the stepped region may be integral with the head of the dog. The upper surface 26 of the stepped region is arcuate and conforms to the curvature of the upper conduit such that when the dogs are in their locked position they provide a substantially closed ring around the upper conduit of the connector.

Alternatively, the upper surface of the stepped region may be straight, the dogs forming a series of flats mating with similarly machined flat areas of the upper conduit to form a closed hexagon, pentagon or other polygonal shape as is appropriate for the number of dogs.

The outer surface 27 of the dog is tapered outwardly from the apertured end to the shoulder as will be discussed further below Each dog is mounted on a pivot pin 20 to an individual pivot block 28. The pivot block is shaped such that it is adjacent to each side of the lower end of the dog. The pivot pin passes 20 through one side of the pivot block, the lower end of the dog and on through the other side of the pivot block. The pivot block & dog assembly is then mounted into mating recesses 29 in the side of the lower conduit in a configuration that the axial load on the dog during operation is reacted directly into the body of the lower conduit.

The pivot pin may be a separate component as described above or may be a cylindrical boss machined directly into the lower section of the dog material. In this case the pivot block would be split and would engage on each of the integral bosses.

The dogs may be biased to the open position by means of gravity alone as the design configuration shown is mounted in the vertical position. Alternatively, a biasing means (not shown) such as for example in the form of tensile spring members may be provided to bias the dogs into the open position. A disconnect performed with applied tension and bending as would occur in an emergency unlock would act to forcefully throw the dogs to the open position. A disconnect under controlled conditions that could also occur would preferably incorporate a biasing means as described above. Alternatively a torsional spring can be incorporated at the dog pivot point.

Actuation means are provided for forcing the dogs from the open position to the locked position against the bias of the biasing means. The actuation means in the illustrated example is a substantially annular collar 30.

The inner surface of the collar has a substantially conical profile with a shallow taper.

Slots 31 are cut into the internal profile of the collar 30 to create a recess. This recess provides a space for the dogs 18 when in the open position so allowing them to move back to their fully open position. The edge 32 at the bottom of this recess that touches on the back of the dogs acts to lift the dogs from fully open to close to closed with continued axial movement of the collar.

The shallow taper engages with the corresponding profile on the back 27 of the dogs (after the collar has rotated the dogs largely to their final position) and generates high preload forces by means of a wedging action.

An upper flange 33 is provided on the outside of the collar under which actuating cylinders 34 are mounted. The cylinders 34 act on this flange to force the collar upwards. The collar may also be configured with individual cylindrical recesses to house the individual cylinders with the cylinders being wholly mounted in the recess or the recess itself forming a pressure retaining wall of the cylinder.

An additional profiled annular ring 35 is attached to the upper surface of the actuating means. The profile is such that the inner surfaces 26 of the dogs and the inner surface of the additional ring 35 provide a largely smooth conical surface that is free from protrusions that can be caught by the upper half on release and free from any substantial holes/cavities into which part of the upper may get caught. This feature is designed to ensure that on release of the connector the two halves will separate cleanly unimpeded by any secondary unintended attachment. This is important to ensure that an initial quick & clean disconnect is then not undone by subsequent snagging.

Retaining means 36 are provided to hold the locking means 18 in the locked position. The retaining means is formed as a substantially annular collar slidably mounted over upper conduit. In the embodiment shown, the retaining means is deployed by one or more hydraulic pistons 37 which are mounted above the annular flange 9 of the upper conduit. The pistons 36 lower the retaining means to bring the retaining means into engagement with the recess 25 in the head of the dogs when they are in the locked position.

The depth of the retaining means which engages in the recess 25 of the dogs is significantly shorter than the height of the face of the actuating means 30 which is used to apply a force to the dogs to move the dogs into the locked position.

The operation of the connector will now be described. The lower conduit 3 is mounted on the upper end of a subsea installation using known mounting means. The actuating means 30 is in the retracted position and the locking means 18 are in the open position. The upper conduit 2 of the connector is mounted on the lower end of a riser which is then suspended from a surface vessel towards the subsea installation. The retaining means 36 of the upper conduit is held in the raised position against the underside of flange 9.

As the upper conduit is lowered towards the lower conduit, the central projecting portion 7 of the upper conduit engages in the central recess 10 of the lower conduit and the upper conduit is lowered until the transition faces 8, 11 and the abutment surfaces 6 are engaged.

Alignment of the frame elements may be provided by a projection on one frame member engaging in a profiled slot in the other frame member. As the two frame members are drawn together and the faces of the upper and lower conduits approach each other, the profiled slot aids fine positioning of the frame members to line up the bores.

As the upper and lower frame elements are drawn together, the elbow 125 of the upper frame element sits within the peripheral wall 131 of the annular housing on the lower frame element in a close fit relationship.

Hydraulic fluid is then pumped into the cylinders 34 to raise the actuation means 30 and the profiled ring 35 around the upper end of the lower conduit 3.

As the actuation means rises there is initial contact between the lower edge 32 of the recesses in the collar as described above and the lower outer surface of the dogs 18. This contact points run up the back of the dogs 27 swinging them up to a largely vertical position. This initial stage swings the dogs through a large angle for relatively short axial travel of the collar due to the geometry of the contact point versus the dog pivot axis.

Towards the end of this travel the contact between the collar and dogs is transferred to the mating conical surface of the collar which engages with the mating conical surface 27. With continued upward travel of the collar 30 bringing the two faces forcibly into contact so creating a wedging action to preload the connection.

The hydraulic control couplers 16 are extended out of the bores in the lower frame element and into the bores in the upper frame element thereby providing a hydraulic connection across the connector.

The shoulders 22 of the dogs may be received in slots in the outer surface of the lower conduit. The upper surface 26 of the stepped region is arcuate and conforms to the curvature of the upper conduit such that when the dogs are in their locked position they provide a substantially closed ring around the upper conduit of the connector.

Once the stepped region 23 of the dogs 18 are engaged over the lower flange 4 of the upper conduit, and whilst the actuation means 30 is still in position around the locking means, the retaining means 36 is activated by hydraulic actuation and moves downwardly around the upper conduit until the retaining means engages in the recess 25 in the dogs.

After the initial activation of the locking means 18 and subsequent engagement of the retaining means 36, the actuating means 30 is actuated back to its lower position together with the profiled ring 36. This allows the space required for the dogs 18 to move to the open position on release of the retaining means. When the actuating means is in this lower position the additional profiled ring provides windows into which the recessed dogs fall back.

The mechanical clamping force imparted across the interface between the upper and lower conduit is maintained in the tension in the dogs 18. The retaining means 36 maintains the upper end of the dogs in the as loaded condition as so maintains the connector preload after the main actuation cylinders 34 have been retracted. This preload resists the high operating pressures within the connector combined with externally applied tension and bending forces to prevent separation of the interface.

The retaining means 36 resists the outward radial movement of the upper end of the dogs that would allow the pretension through the dogs to be released.

Valves above and below the connector (not shown) can now be opened in order to establish a fluid path between the riser and the subsea installation.

In the event of an emergency situation arising such as the vessel losing engine power or losing position guiding means, the vessel will begin to drift from a position immediately overhead the rigid riser. In this situation the valves above and below the connector are shut in accordance with standard safety procedures and over a fixed time and the control connectors 16 are lowered to remove all peripheral connection between the upper and lower frame members 12, 13 prior to release of the main locking means.

As soon as the valves are shut and fluid connection between the upper and lower conduits is broken, the connector can be released by activating the hydraulic pistons 37 thereby raising the retaining means 36 clear of engagement with the recess 25 of the dogs 18. The stroke of the retaining means 36 is significantly shorter than that of the actuating means 30 and therefore an immediate saving in the volume of hydraulic fluid required to raise the retaining mean 36 in comparison to deploying the actuating means results in a corresponding time and energy saving during an emergency disconnection procedure where every second can be critical.

Furthermore, in addition to the stroke of the retaining means being shorter than that of the actuating means, the geometry of the connection is such that the force required to release the retaining means is less that that required to generate the preload in the dogs 18 during locking of the connector. This results in a smaller hydraulic area required and hence a reduced volume of hydraulic fluid to deploy the actuating means and release the release means respectively. Each of these i.e. a shorter stroke and a reduced release volume individually and combined serve to reduce the release volume and hence the time required to disconnect the connector.

As soon as the retaining means 36 is raised, the dogs 18 spring back to their open position. As the actuation means 30 is withdrawn as soon as the retaining means 36 is deployed, the opening of the locking means is unhindered by the actuation means 30 and there is no risk of damage to the actuation means 30 or the locking means by the force of the dogs springing back to the open position.

As the upper and lower conduits separate, the first component 123 of the upturned rim 122 moves vertically upwards in contact with the peripheral wall 131 until the upper frame element clears the lower frame element. At the same time, the free ends of the conduits separate substantially vertically thus ensuring that the gasket 50 is undamaged during the disconnection procedure. The protection provided by the substantially vertical alignment between the elbow of the upturned rim 122 and the peripheral wall 131 is only required over a short distance to cover the height of the gasket 50.

In the event that the upper frame element is pulled from the lower frame element at an angle, for example where a vessel moves on the surface during the disconnection procedure, the transition between the base portion 130 and the peripheral wall 131 of the housing on the lower frame element provides a point of rotation around which the elbow 125 of the upper frame element can rotate thereby enabling the surfaces of the upper and lower conduits to separate substantially vertically without damage to the gasket 50.

The upper conduit 2 can then be lifted away from the lower conduit 3. As the upper surface of the profiled ring 35 tapers upwards and outwards from the edge of the lower conduit, it does not impede the removal of the upper conduit and therefore if the upper conduit exits the abutment position at an angle due to drifting of the vessel, this can be accommodated and the lower flange 4 of the upper conduit can not snag on any of the components of the lower conduit of the connector.

As it will be appreciated, the connector can be disconnected swiftly in an emergency situation thereby ensuring that a stricken vessel can be disconnected from any physical connection to the seabed as quickly as possible.

Furthermore, as the actuating means 30 of the connector are withdrawn after the retaining means 36 is deployed, the disconnection of the conduits can be made without damage to either the co-operating faces of the conduits or to the components of the connector itself. This means that the connector can be reused following disconnection in an emergency situation which is a significant advantage of the present invention.

Additionally, following an emergency disconnect procedure, the connector can be redeployed as soon as power is returned to the vessel thereby reducing the downtime of the subsea installation following such a situation.

Modifications and improvements may be made without departing from the scope of the present invention. For example, whilst the actuating means and retaining means of the embodiment described above is deployed by one or more hydraulic cylinders, either or both components may be deployed by one or more hydraulic cylinders or pistons or a combination of each.

Figure 12:
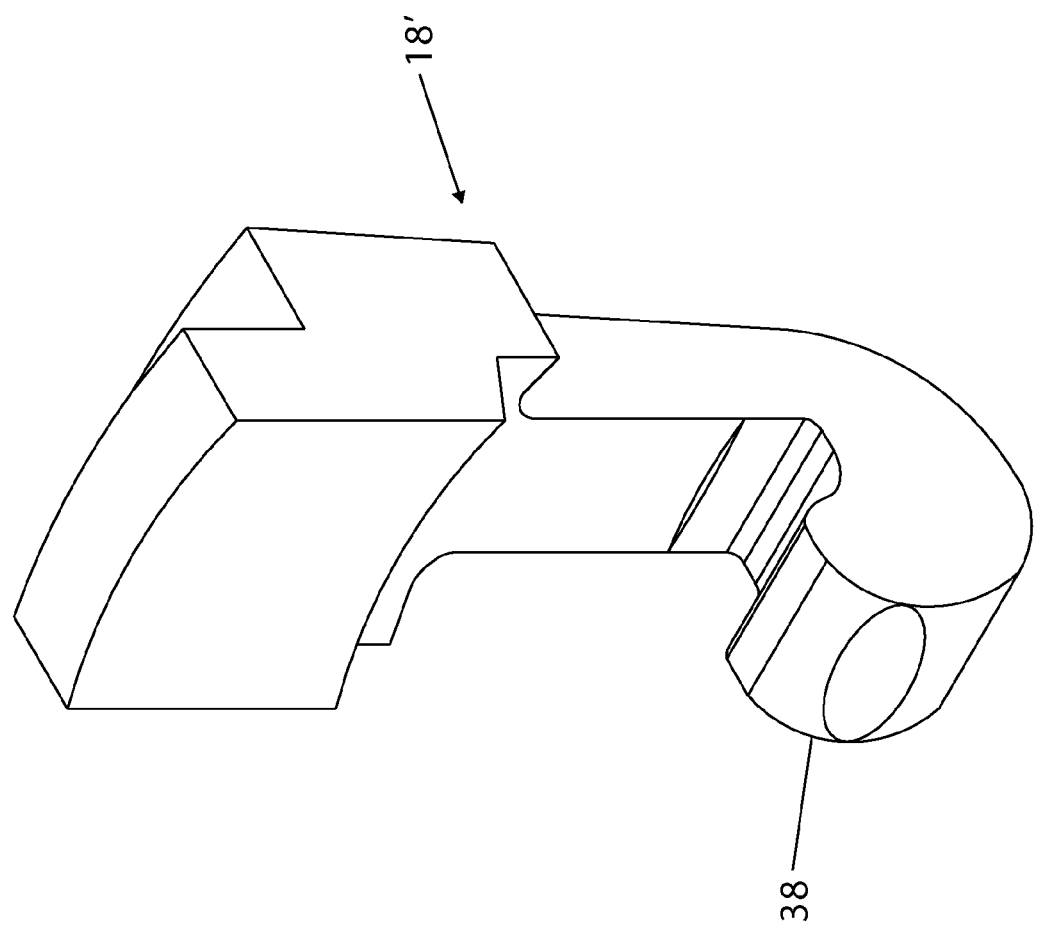
FIG. 12 is a front view of a further alternative locking means of the connector.
Figure 13:
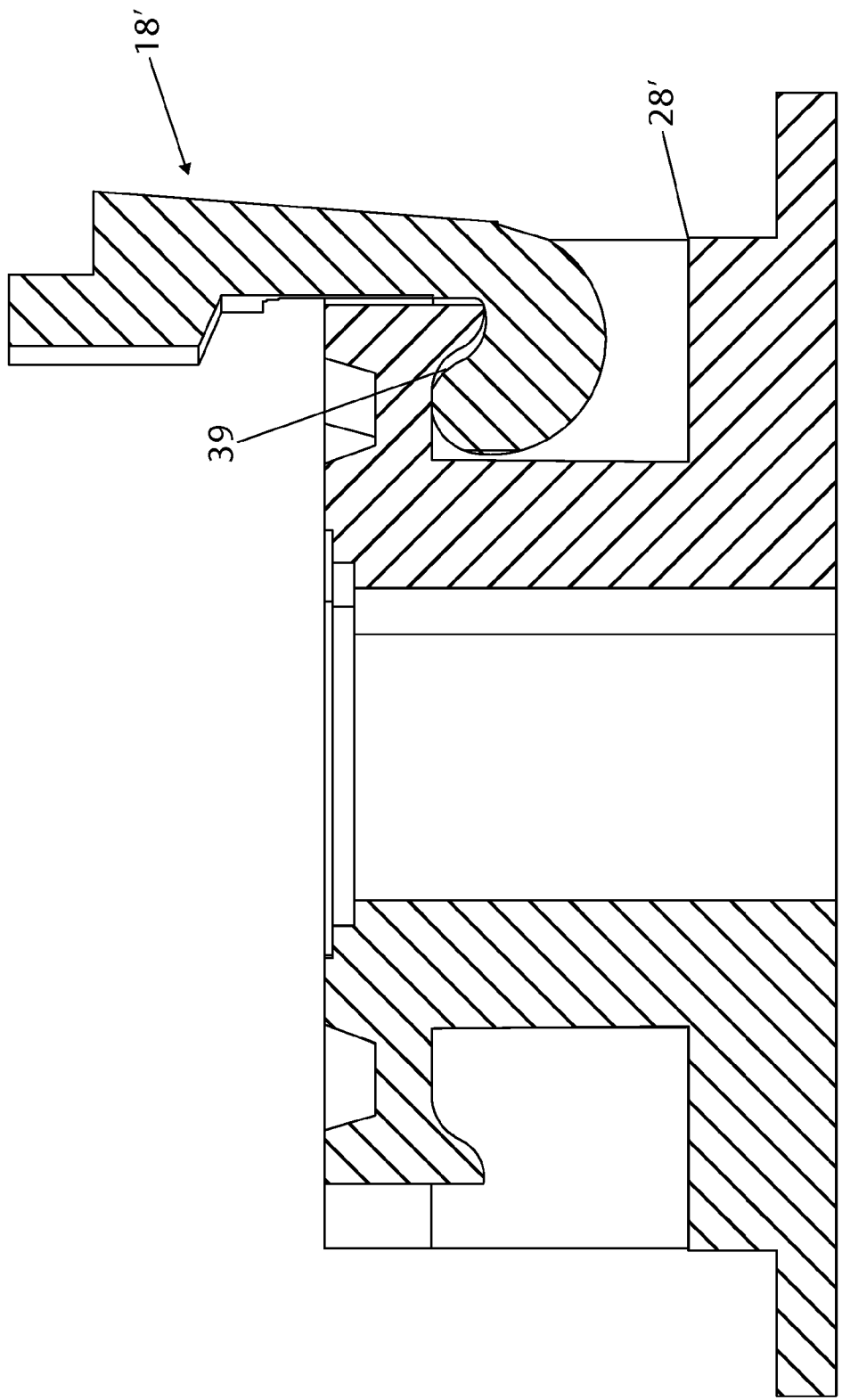
FIG. 13 is a schematic view of the locking means of FIG. 12 mounted on the lower conduit of the connector.
Figure 14:
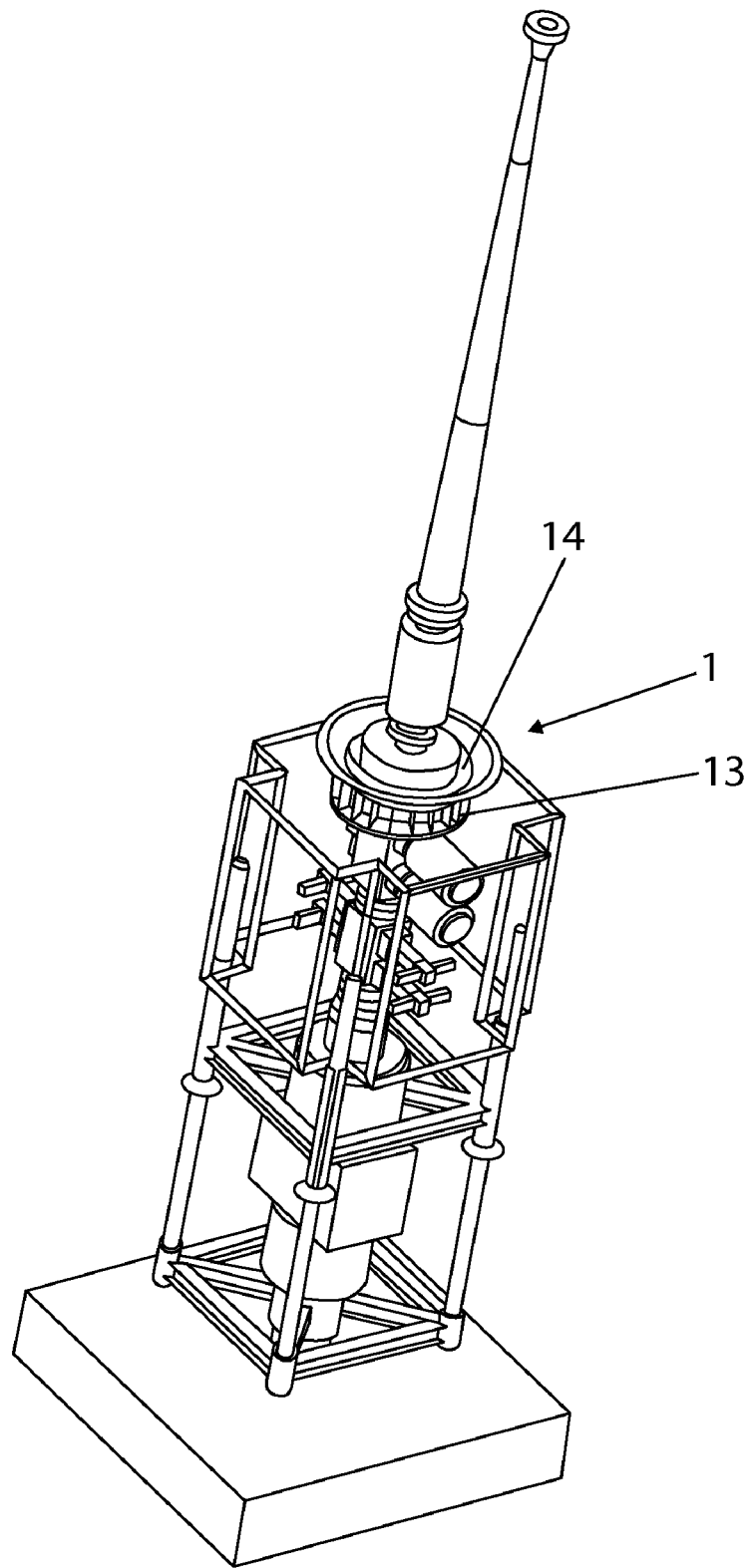
FIG. 14 is a schematic perspective view of a subsea installation with the lower part of the connector of FIG. 1 in position.
Figure 15:
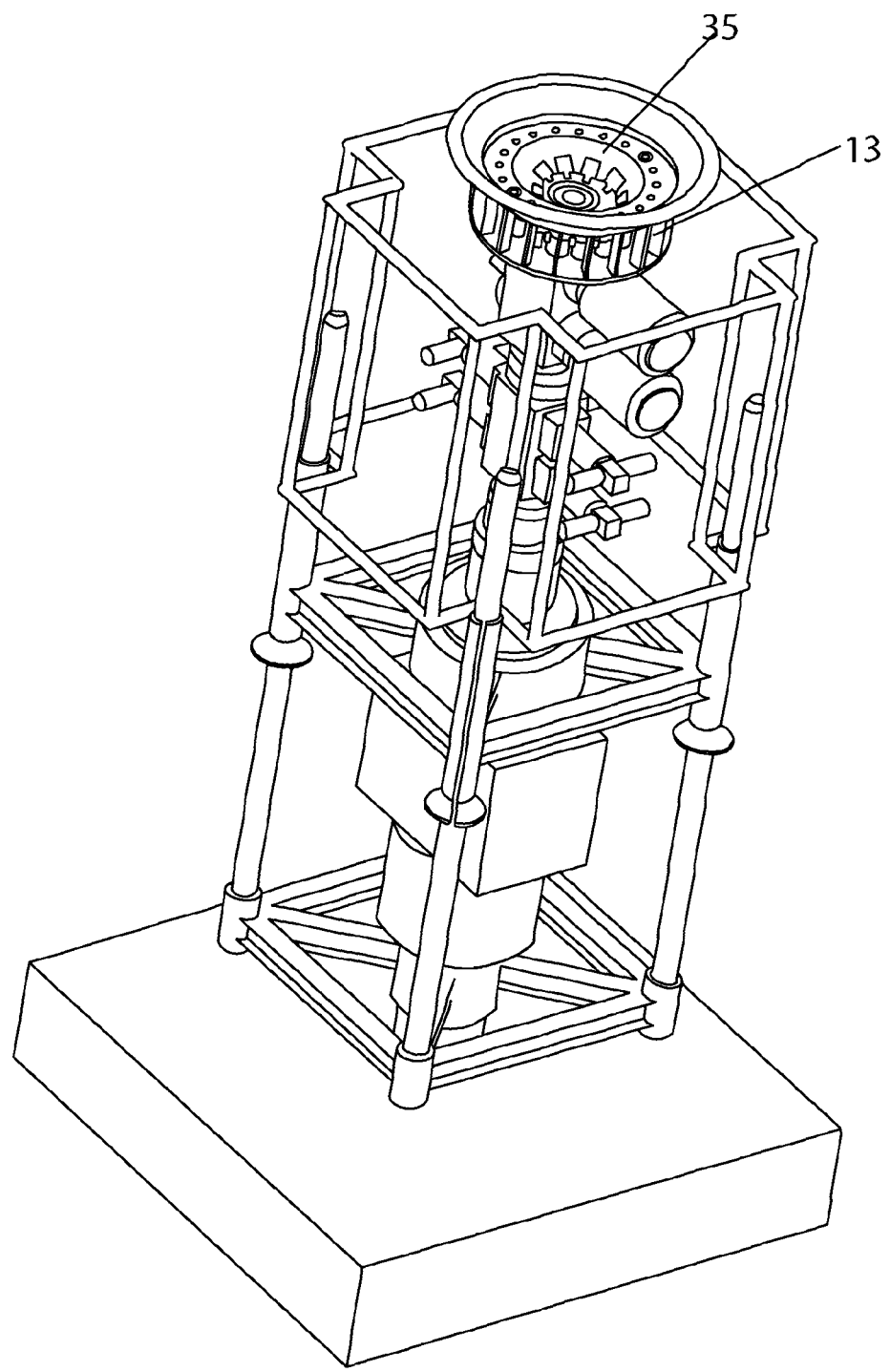
FIG. 15 is a schematic perspective view of the subsea installation of FIG. 14 with the upper half of the connector of FIG. 1 removed.

An alternative means of achieving the rotation of the dogs 18 around the lower end whilst providing a means of reacting the substantially axial tension would be to have the lower end of the dog profiled and engaging with the corresponding mating geometry in the lower conduit such that the two mating profiles allowed rotation around the desired axis and provided two mating faces when in the locked position with sufficient bearing and shear area to resist the axial loads. This is shown in FIGS. 12 and 13 in which the dogs 18' have a profiled surface 38 which reacts against a profiled slot 39 in the mounting block 28'.

Figure 10:
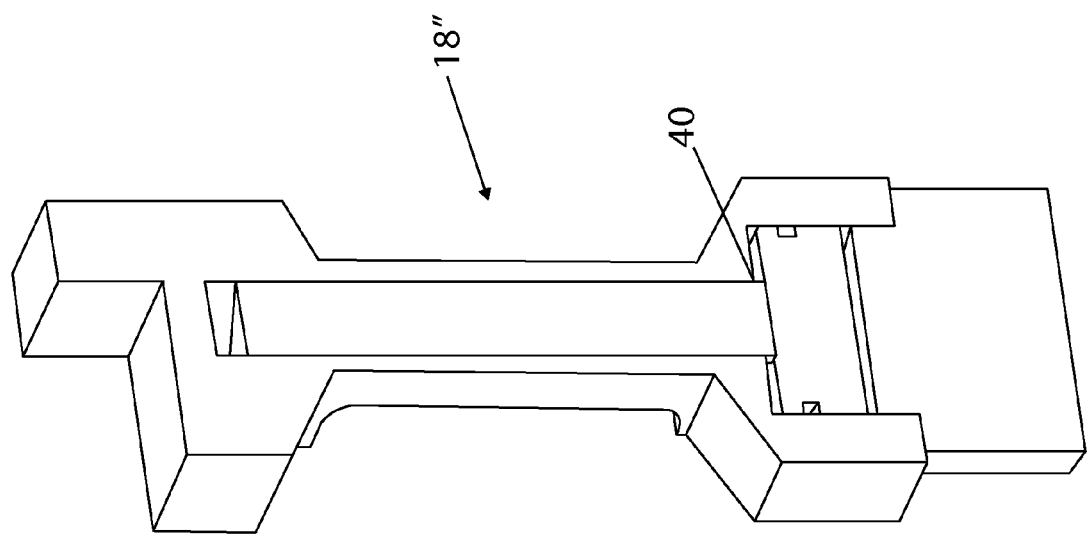
FIG. 10 is a rear schematic view of an alternative locking means of the connector.
Figure 11:
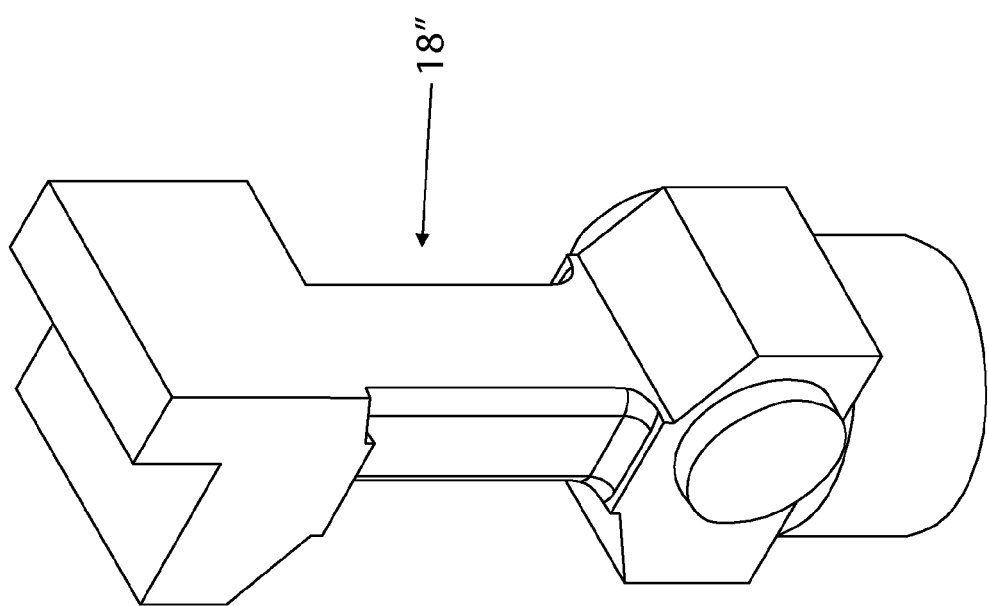
FIG. 11 is a front view of the locking means of FIG. 10.

As a further alternative shown in FIGS. 10 and 11, actuators such as for example in the form of hydraulic cylinders 40 may be mounted within the dogs 18" such that upon operation of the actuators the length of the dogs are increased which introduces a pre-load into the dogs upon operation.

In a further embodiment, the retaining means 36 may be provided with an internal annular flange which corresponds in depth to the second annular flange of the upper conduit. The lower end of the retaining means may be provided with an outer annular flange.

The outer annular flange on the lower end of the retaining means resists high radial forces that may otherwise distort the lower end of the retaining means.

An annular stop means may be provided around the upper conduit and is sized to fit between the outer surface of the upper conduit and the retaining means.

The annular stop means and the second flange of the upper conduit define the upper and lower limits of vertical movement of the retaining means. Two hydraulic chambers of varying volume are defined, the first between the upper surface of the inner flange of the retaining means and the stop means, and the second between the lower surface of the inner flange of the retaining means and the second flange of the of the upper conduit. When the connector is in an unlocked position, the inner annular flange of the retaining means is adjacent to the underside of the annular stop means. When the connector is in a locked position and the locking means are engaged, the retaining means can be lowered to a locked position by forcing fluid in to the first hydraulic chamber in which the underside of the inner annular flange of the retaining means abuts the upper surface of the upper flange of the upper conduit.

As the retaining means is lowered, the outer annular flange of the retaining means engages in the recess behind the head of the dogs to hold the dogs in the locked position.

Hydraulic fluid is forced into the second fluid chamber between the inner flange of the retaining means 36 and the upper flange 9 of the upper conduit to raise the retaining means out of engagement with the dogs to allow the dogs to return to the open position.

In a further embodiment the dogs may be replaced by substantially C-shaped clamps which are radially extendable from an open position within the profiled ring to an extended locked position in which they clamp around cooperating flanges of the upper and lower conduits. In this embodiment, the dogs may have upper and lower projections which extend substantially axially to the conduits. Retaining means in the form of one or more locking rings which can be deployed over the projections hold the dogs in the locked position. The dogs may be spring biased into the open position such that upon release of the retaining means, the dogs spring back to the open position to allow the connection to be released safely.

In a still further embodiment, the actuating means to move the dogs into the locked position may be provided by a hydraulic piston acting on the end of the locking dogs adjacent the pivot point to swing the dogs from the open position to a vertical clamping position and a further transversely mounted piston which is operable to apply a radial force to the piston against the outer surface of the upper conduit to preload the dogs prior to the retaining means being deployed.

Figures 17, 17A:
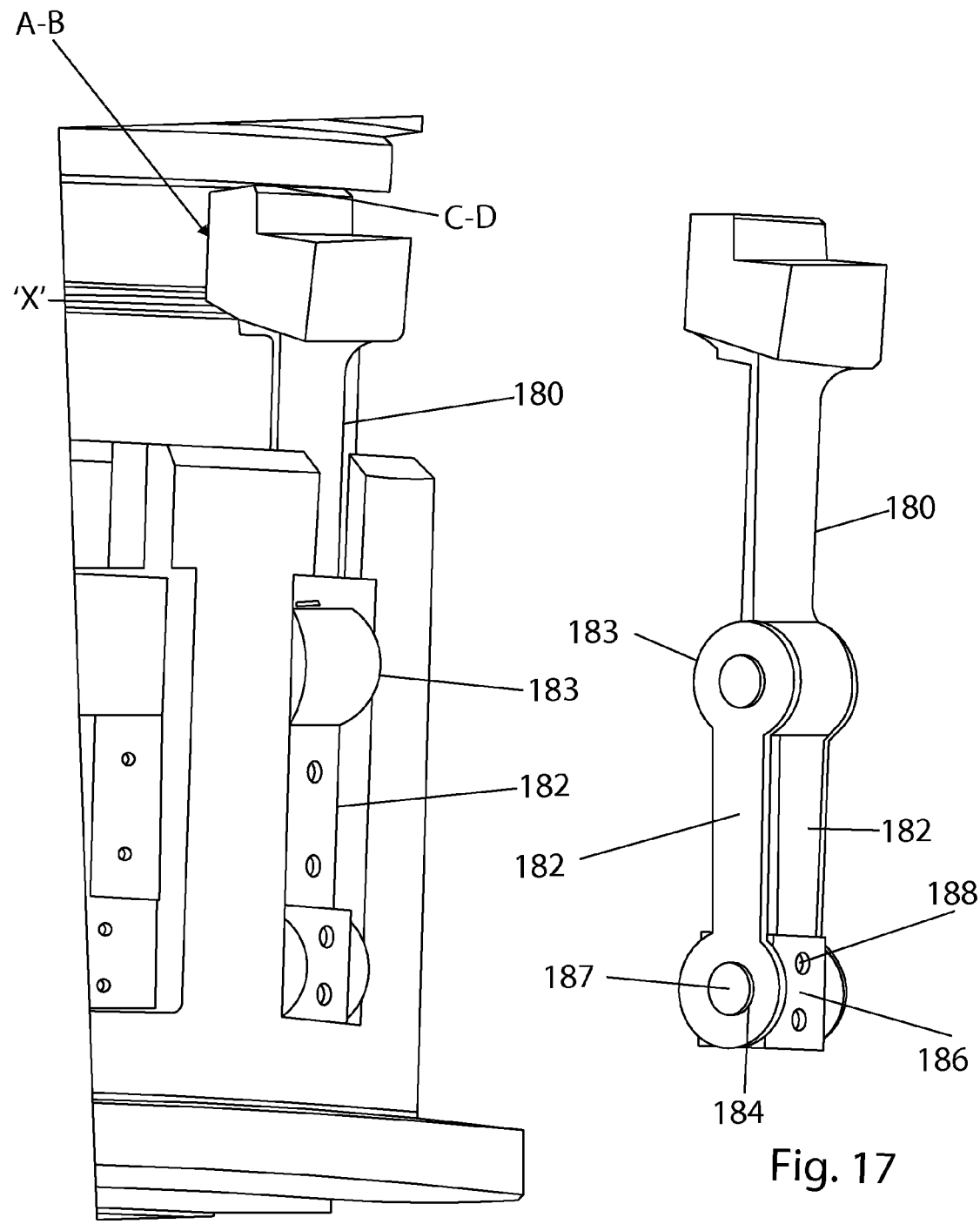
FIGS. 17 and 17a are schematic perspective views of the alternative locking means of FIGS. 16 and 16a in a second, locked position.

A further embodiment of the invention comprising modified locking dogs 180 is shown in FIGS. 16-17*a*. The locking dogs are shown in FIGS. 16 and 16*a* in a first, unlocked position, and in FIGS. 17 and 17*a* in a second, locked position.

Figure 18:
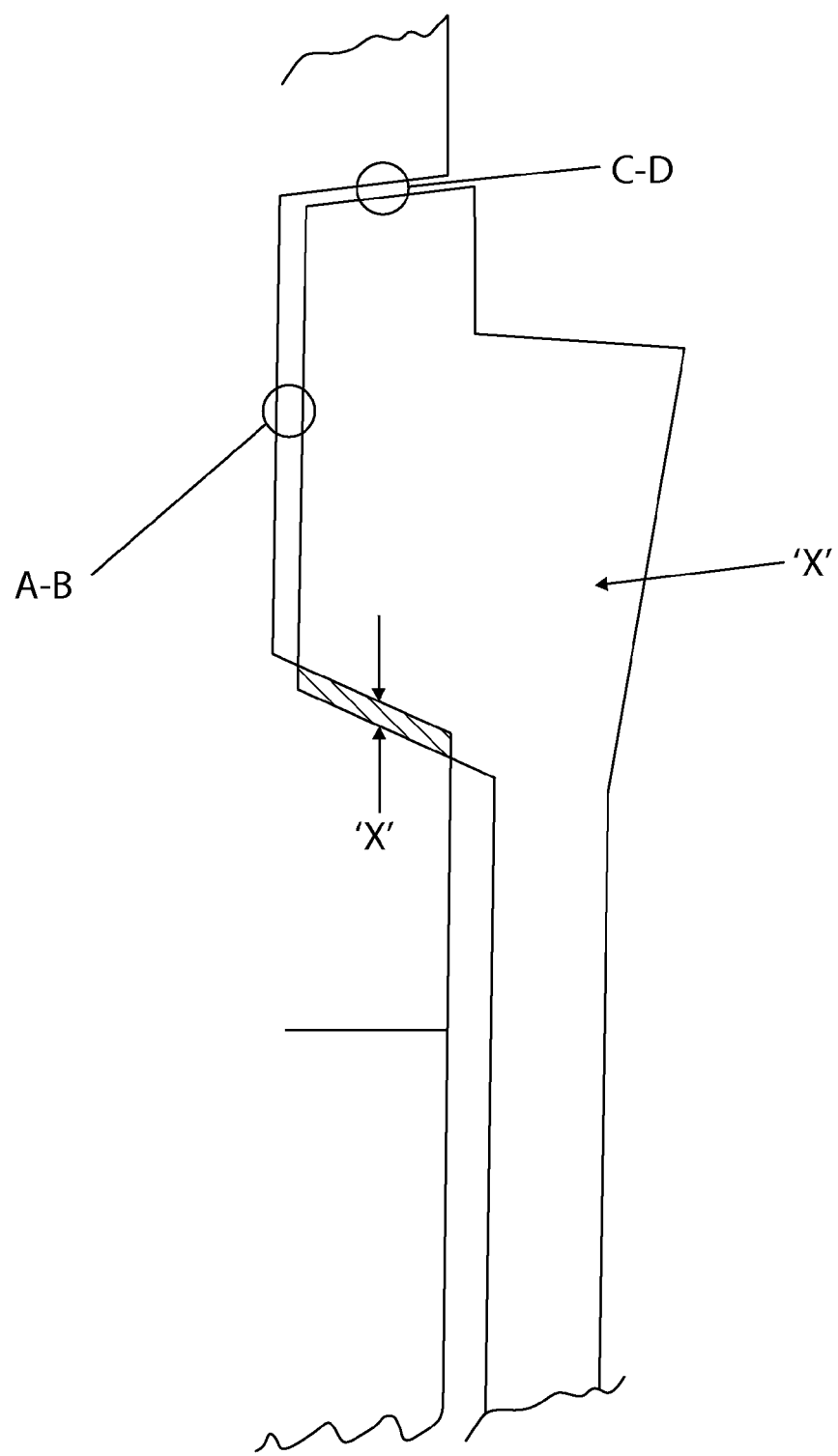

In this embodiment, the locking dogs are pivotally mounted on a pair of elongate tensile members 181. These tensile members are made from steel or any other suitable metallic material similar in strength to the dogs themselves. The amount of load that the can be applied to the dog and hence the amount of preload that can be achieved is determined by the material properties (tensile strength and cross sectional area (CSA)). For any given load (CSA and strength fixed) the extension (stretch) of the dog is determined by the length of the member under tension. The function of the additional tensile members is to provide additional length and hence elongation (stretch) in the dog assembly for a given applied load. The design is such that when the connector is locked, the dog is stretched by a distance "x" shown in FIG. 18. Dimension "x" is subject to variation due to the inevitable machining tolerances and this variation will in turn result in a slight variation in the amount of load in the dog assembly. The additional tensile members provide additional axial stretch for a given load so reducing the effects of the variance in dimension "x" on the stretch (and hence the load) in the dog assembly.

The tensile members each comprise a substantially flat rectangular arm 182 having an enlarged head 183 at either end. In the embodiment shown, each enlarged head is substantially circular and is integrally formed with the arm. An aperture 184 is provided through each enlarged head, the apertures being substantially circular in form and centrally located in the enlarged heads.

The locking dogs have a similar form and profile as described above and each is mounted on a pivot pin 185 which may be integrally formed with the locking dogs or may be provided as a separate component.

The pivot pin 185 of the dog passes through the circular apertures 184 in the enlarged heads at one end of the tensile members 181 to enable the dog to pivot about the axis of the pin on the tensile members. A mounting means is provided between the other ends of the tensile members to facilitate mounting of the dogs to the upper end of the lower conduit 3. In this embodiment the mounting means is a block 186 having a width suitable to allow the block to pass between the free ends of the tensile members 181.

The block has a projecting boss 187 on either side which has a diameter which corresponds with the diameter of the apertures 184 in the enlarged heads of the tensile members. The bosses 187 pass through the apertures 184 in the enlarged heads of the tensile members and this provides for free rotation at each end of the tensile members 181. The benefit of the mounting means of the additional tensile members is that because the tensile members are free to rotate about the axis of the mounting bosses (top and bottom end) no bending moment is set up in the parts as load is applied. The applied load is purely direct tensile so ensuring an even stress distribution across the cross section of the additional tensile members. As no local bending stress is set up in the tensile members under load then their thickness can be controlled and reduced thereby enhancing their ability to stretch under load.

Thus, providing the additional tensile members mounted as described above allows maximum use of the material cross section to achieve maximum axial extension under load.

In addition to the above the connection method allows the dog itself to still rotate outwards about point A as shown in FIG. 17 as described above. The design of this connector is such that the dog swings out to quite a high angle (about 45 degrees in its current configuration) to allow a clean unobstructed disconnect.

By ensuring the dog to tensile member connection allows rotation then when the dogs swing out on disconnect they describe a much smaller arc than had the connection not allowed for rotation. Hence, this decreases the overall space envelope of the connector which provides a significant advantage.

Bores 188 are provided through the mounting block to receive fixing means (not shown) to mount the block to the lower conduit.

In this embodiment, as the locking means move from the unlocked to the locked position, the dogs are preloaded through the tensile members 181 and this preload resists the high operating pressures within the connector to prevent separation of the interface.

As with the embodiments described above, the locking dogs are moved from the unlocked position shown in FIGS. 16 and 16*a* to the locked position shown in FIGS. 17 and 17*a* by raising the actuating means 30 from the retracted position over the back of the dogs. This engages and stretches the dogs which swing into the locked position. Tensile stress is imparted to the dog cross sections while the dogs move from the unlocked to the locked positions.

This tensile stress must not exceed the maximum tensile capacity of the dog which would cause yielding of the dog and ultimately failure of the connector. In order to ensure that over pressure in the actuating cylinders (34) does not cause the actuating means (30) to exert an excessive force, the movement of the dog inwards towards the lower conduit (3) is controlled by contact at the face interface A-B.

At this point the loading being applied through the head of the dog (21) from the interface between the tapered outer surface (27) of the dog and the actuating means (30), is transmitted directly through the head of the dog into the lower conduit (3) so stopping excessive stretch of the dog.

In order to prevent the head of the dog travelling up further still with axial sliding contact at the face interface A-B if excessive force is applied, an additional protection is provided in that the faces at face interface C-D come into direct contact so firmly halting any further stretch of the dog and ensuring the tensile stress in the dog remains within allowable limits.

In the embodiments described above, the actuating means 30 is described as an integral part of the connector which remains in the lower frame element after it is retracted and the retaining means in engaged. It is envisaged that the actuating means 30 may be a separate member which is placed on the assembly in order to create the initial preloading force and then removed after the retaining means has been engaged.

The invention claimed is:
1. A connector comprising:
a plurality of dogs for locking cooperating faces of upper and lower conduits together;

wherein said plurality of dogs are movable between an open position and a locked position;
a piston for moving the plurality of dogs into the locked position;
a collar that retains the plurality of dogs in the locked position once the piston is withdrawn;
wherein the connector connects cooperating faces of a plurality of components together; and
wherein, when the collar is removed, the plurality of dogs return to an unlocked position thereby allowing separation of the cooperating faces without snagging of the plurality of components.

2. The connector according to claim 1, wherein a stroke of the collar to release the plurality of dogs is shorter than a stroke of the piston to move the plurality of dogs into the locked position.

3. The connector according to claim 1, wherein the collar and the piston are moved by respective pistons.

4. The connector according to claim 3, wherein the pistons are hydraulically actuated.

5. The connector according to claim 4, wherein a volume of hydraulic fluid required to release the collar is less than a volume of fluid required to deploy the piston to bring the plurality of dogs into the locked position.

6. A connector according to claim 1, wherein a force required to release the collar is less than a force required to deploy the piston to move the plurality of dogs into the locked position.

7. The connector according to claim 1, wherein spring members are provided to bias the plurality of dogs into the open position.

8. The connector according to claim 1, wherein means are provided for pretensioning the plurality of dogs.

9. The connector according to claim 8, wherein the pretensioning means increases a length of the plurality of dogs.

10. The connector according to claim 8, wherein the pretensioning means comprises a hydraulic cylinder mounted within the plurality of dogs.

11. The connector according to claim 1, wherein the piston is provided with a profiled surface which co-operates with a profiled surface on the plurality of dogs to pretension the plurality of dogs as they are moved into the locked position.

12. The connector according to claim 1, wherein the plurality of dogs are pivotally mounted to one of said plurality of components.

13. The connector according to claim 12, wherein the plurality of dogs are pivotally mounted adjacent an upper end of the lower conduit.

14. The connector according to claim 11, wherein the plurality of dogs are pivotally mounted to an elongate member, said elongate member being mounted to one of said plurality of components.

15. The connector according to claim 14, wherein the plurality of dogs are provided with a pivot pin, wherein the pivot pin is received in an aperture in the elongate member.

16. The connector according to claim 12, wherein said plurality of dogs have a clamping surface which forms a substantially continuous ring when in the locked position.

17. The connector according to claim 1, wherein the piston comprises the collar which is slidably mounted on one of said plurality of components.

18. The connector according to claim 1, wherein the piston is raised to move the plurality of dogs into the locked position.

19. A connector according to claim 1, wherein the collar comprises an annular collar.

20. The connector according to claim 1, wherein said collar is slidably mounted above the plurality of dogs.

21. The connector according to claim 1, wherein the connector comprises first and second conduits adapted to be mounted on a riser and subsea installation respectively, wherein cooperating faces are provided on the first and second conduits.

* * * * *